United States Patent [19]

Adams

[11] 4,340,653

[45] Jul. 20, 1982

[54] GALVANIC DRY CELL EMPLOYING A TAPERED CATHODE BOBBIN

[75] Inventor: Richard C. Adams, Sevierville, Tenn.

[73] Assignee: Union Carbide Corporation, Danbury, Conn.

[21] Appl. No.: 249,018

[22] Filed: Mar. 30, 1981

[51] Int. Cl.[3] .............................................. H01M 2/18

[52] U.S. Cl. .................................... 429/133; 429/164; 429/224

[58] Field of Search ................................ 429/133–135, 429/164–174, 224

[56] References Cited

U.S. PATENT DOCUMENTS 2,738,374 3/1956 Fuller et al. .................... 429/133 X
3,615,859 10/1971 Schumm, Jr. ........................ 136/107
4,105,835 8/1978 Guitton et al. ...................... 429/133

*Primary Examiner*—Charles F. LeFevour
*Attorney, Agent, or Firm*—Cornelius F. O'Brien

[57] ABSTRACT

A galvanic dry cell comprising a tapered cathode bobbin disposed within and separated from a cylindrical anode by a variable thickness electrolyte paste wall separator such that the advantages of a thick paste wall separator (about 0.125 inch thick for "D" size cells) and a thin paste wall separator (about 0.08 inch thick for "D" size cells) can be obtained in a single cell construction.

10 Claims, 4 Drawing Figures y
4
2
x

FIG. 1
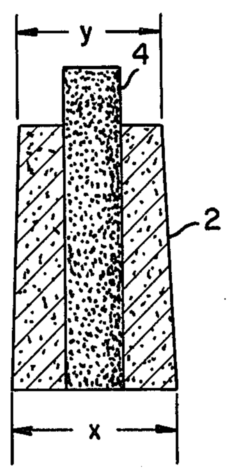
FIG. 3
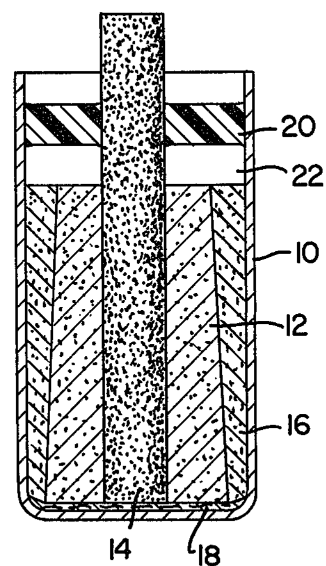
FIG. 2
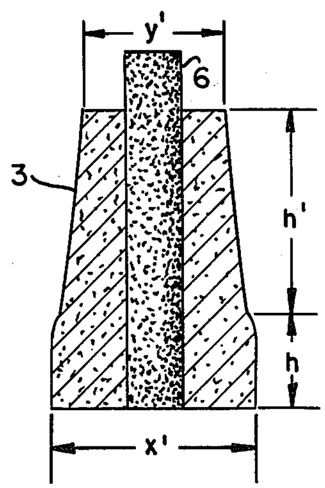
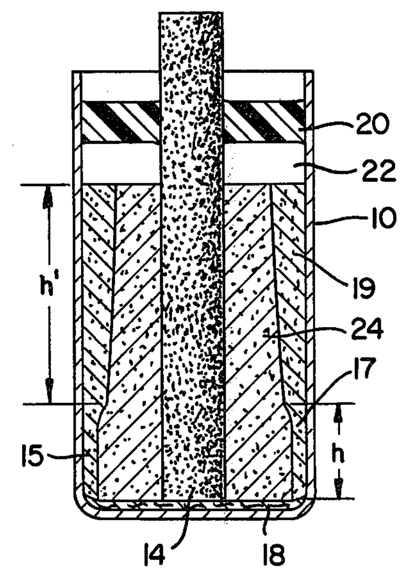
FIG. 4

GALVANIC DRY CELL EMPLOYING A TAPERED CATHODE BOBBIN

FIELD OF THE INVENTION

This invention relates to an electrochemical cell of the cylindrical or round type which employs an electrolyte paste having a variable wall thickness as the separator medium between a tapered cylindrical bobbin and an active anode.

BACKGROUND OF THE INVENTION

Leclanche dry cells may be basically defined as including a consumable zinc anode, a cathode mix cake consisting essentially of a mixture of manganese dioxide as the active depolarizer material, a conductive material such as graphite or carbon black and an electrolyte, and a separator medium interposed between the anode and cathode and containing the balance of the electrolyte. The separator medium is commonly a gelled paste which may be composed essentially of electrolyte, corn starch and flour. The electrolyte for the dry cell is an aqueous solution of ammonium chloride and zinc chloride and may contain small amounts of various inhibitors such as mercuric chloride as well known to those skilled in the art.

In the more familiar cylindrical or round type of Leclanche dry cell customarily used in flashlights and the like, the anode usually consists of a zinc cup or can which often serves as the principal container for the cell elements. The cathode mix cake is molded with a central carbon electrode to form a cylindrical bobbin. The bobbin resides in the zinc cup or can and is separated therefrom by the gelatinous electrolyte paste forming the separator medium.

Since these dry cells tend to generate and expel a liquidous product often referred to as "spew" particularly on overdischarge, it is customary to encase the cell proper within an outer container of one sort or another in an effort to accommodate the spew and to prevent the spew which is highly corrosive from coming into contact with the flashlight or other instrument in which the cell is used. Another serious problem resides in the fact that these cells often generate copious quantities of gas on overdischarge which if not properly vented could give rise to the buildup of dangerous internal pressure inside the cell. Thus it is usually the practice to provide some sort of venting means in the structure of the outer cell container. Usually the carbon electrode is porous and serves as an internal venting path within the cell. Unfortunately, the pores of the carbon electrode sometimes are blocked by the spew and consequently either the internal gas pressure builds up to a dangerous level or the spew is forced with the gas into and through the venting means in the outer cell container thereby causing leakage.

Considerable effort has been expended in an attempt to generally improve the performance of the Leclanche dry cell. These efforts have been mainly directed to the improvement of the leakage resistant characteristics of the dry cells and also to the problem of providing maximum service life from the cells at a relatively low cost. Thus, it has been proposed to modify the structure of the outer cell container in various ways in order to make the container stronger and less apt to leak, and by providing superior venting electrodes and gas vents. Various proposals have also been made for improving the service life of the dry cells and probably the most notable has been the contribution of the pasted thin paper or film separator. The use of these thin separators in place of the gelatinous electrolyte paste has made it possible to employ more cathode material for any fixed volume in a particular size cell. One disadvantage of this type of construction is that the cell is more apt to leak "spew" particularly on overdischarge.

It has been recognized for many years now by those skilled in the art that if the formation and movement of the spew could be substantially reduced or eliminated, the dry cell would be much less apt to leak. Despite past research studies concerned with the various aspects of the cell reaction, no practical means has been developed for reducing the amount of spew formed within the dry cell while at the same time maintaining a high level of service. Consequently, resort has been taken mainly to improving the structure of the outer cell container with a view towards accommodating the spew and preventing its leakage from the cell.

In U.S. Pat. No. 3,615,859 it is disclosed that if the gelatinous electrolyte paste separator wall thickness is significantly increased, the formation of spew can be substantially reduced without seriously reducing the service life. It was also disclosed that the use of a thick wall paste separator brings about a distinct change in the character and location of the by-products of the cell reaction while at the same time increasing the electrical efficiency of the cell.

Although the thick wall paste separator type zinc cell exhibits excellent leakage resistance, the cell when subjected to abuse conditions, such as charging, continues to build up gas pressure within the cell until zinc dendritic growth extends through the separator to contact the cathode thereby internally shorting the cell and stopping any further electrolytic generation of $H_2$. However, due to the thickness of the paste wall separator, there is a possibility that under abuse conditions, the cell may disassemble prior to shorting due to the increased time required for the dendritic growth to extend through the separator.

It is, therefore, an object of the present invention to provide a cell, such as a Leclanche dry cell or a zinc-chloride cell, with an excellent leakage resistance characteristic while at the same time providing a safety means for substantially preventing cell disassembly when subjecting the cell to abuse conditions.

Another object of the present invention is to provide a cell with the benefits of both a thick paste wall separator and a thin paste wall separator.

Another object of the present invention is to provide a cell with a tapered cylindrical bobbin disposed within a cylindrical type anode such that the thickness of the electrolyte paste wall separator between the bobbin and the anode can vary along the longitudinal axis of the cell so as to exhibit the benefits of a thick paste wall separator and a thin paste wall separator.

The foregoing and addittional objects will become more fully apparent from the following description and the accompanying drawings.

SUMMARY OF THE INVENTION

The invention relates to an electrochemical cell comprising in combination an anode; a cathode bobbin disposed within and separated from the anode, said cathode bobbin including a porous cathode mix cake comprising manganese dioxide as the active depolarizer material formed with a central electrode rod; and a separator containing an electrolyte solution interposed in the space between the anode and the cathode bobbin and being in contact with the surface of the anode and the surface of the cathode mix cake; the improvement wherein the cathode bobbin has a tapered form with at least a substantial portion of its outer upstanding wall tapered with respect to the longitudinal axis of the bobbin such that its outer diameter varies along the longitudinal axis of the bobbin so that the separator disposed between the outer wall of the tapered bobbin and the inner wall of the anode varies in wall thickness along the longitudinal axis of the centrally disposed electrode rod.

As used herein, a tapered bobbin shall mean a bobbin having an outer diameter that changes along the longitudinal axis of the bobbin. For example, the intersection of the plane containing the longitudinal axis of the bobbin with the upstanding outer wall of the bobbin could form at least one straight line segment, at least one curved line segment such as a concave or exponential curved line segment or a combination of one or more straight line segments and/or one or more curved line segments. Preferably, the tapered bobbin should have a cylindrical base extending in a concave (inwardly bowed) type tapered segment such that the cylindrical portion of the bobbin could accommodate a thin paste wall separator between the cell's anode and the lower segment of the bobbin while the concave tapered portion of the bobbin will be sufficiently narrow to accommodate a thick paste wall separator between the cell's anode and the upper segment of the bobbin.

As used herein, a substantial portion of the upstanding wall of the bobbin shall mean greater than 50% of the longitudinal height of the wall.

The use of the tapered bobbin permits the employment of a relatively thick paste wall separator between a substantial portion of the bobbin and the anode thereby providing excellent leakage resistance for the cell while the use of a relatively thin paste wall separator between a minor portion of the bobbin and the anode will enable dendritic growth to extend quickly through the separator under abusive charge conditions so as to internally short the cell thereby stopping any further electrolytic generation of $H_2$ thus substantially eliminating cell disassembly. In addition, another advantage of the tapered bobbin is that more active material can be employed in the bobbin over the thick paste wall construction thereby increasing the service life of the cell.

The mix cake material for use in the bobbin of this invention can be made using a mixture of manganese dioxide as the active depolarizer material, a conductive material such as graphite and/or carbon black and an electrolyte such as an aqueous solution of zinc chloride with or without ammonium chloride in solution or as a solid. The separator medium could be composed of a gelled paste consisting of the cell's electrolyte, corn starch and flour. The tapered bobbin could have its upstanding wall completely tapered or preferably a portion of between about 20% and 45% or more preferably about 30% of the upstanding wall could be parallel to the longitudinal axis of the rod with the remainder of the wall being tapered. For example, in D-size cells the tapered bobbin could have a mix height of 1.640 inches with an inner diameter of 0.313 inch and an outer diameter of 1.06 inches at the base tapered to a 0.945 inch diameter at the top. Preferably, the tapered bobbin could have a cylindrical base having a diameter of 1.06 inches and a height of about 0.5 inch and then be tapered to a 0.945 inch diameter at the top. In this latter construction the mix height of the tapered bobbin could be slightly increased to allow for additional cathodic material so as to further increase the service life of the cell.

In the forming of the tapered bobbin, it may be desirable to vary the composition of the bobbin to minimize or eliminate any cracking in the bobbin. For example, it has been found that substantially crack-free tapered bobbins can be formed by employing a concave tapered bobbin which can easily be removed from conventional unitary molds. Notwithstanding this, slight cracking in the tapered bobbin will not have any effective disadvantage in the discharge of the cell. The primary disadvantage will be in handling the tapered bobbin and possibly causing the cracks to increase to a degree that small pieces may fall off the bobbin.

The tapered bobbin of this invention is ideally suited for Leclache cell system and zincchloride cell systems.

The present invention will become more apparent from the following description thereof when considered together with the accompanying drawing which is set forth as being exemplary of the embodiments of the present invention and is not intended in any way to be limitative and wherein:

FIG. 1 is a sectional elevational view of a completely tapered bobbin formed with a central electrode rod.

FIG. 2 is a sectional elevational view of a substantially tapered bobbin formed with a central electrode rod.

FIG. 3 is a sectional elevational view taken through a dry cell employing a bobbin as shown in FIG. 1.

FIG. 4 is a sectional elevational view of a dry cell employing a tapered bobbin of FIG. 2.

Referring to FIG. 1, there is shown a tapered bobbin 2 composed of a cathode mix cake consisting essentially of a mixture of manganese dioxide as the active cathode material, a conductive material such as acetylene black, and an electrolyte of zinc chloride, ammonium chloride and water. The cathode mix cake is formed around a centrally disposed electrode rod 4 made of carbon. The outer base diameter of the tapered bobbin is identified as "x" and is tapered upward forming a smaller diameter "y" at the top of the bobbin. Generally the base diameter should be of a size sufficient to allow a relatively thin paste separator between the bobbin and the internal wall of an anode and the diameter at the top should be such as to permit a relatively thick paste separator between the bobbin and an anode as generally discussed in U.S. Pat. No. 3,615,859. The disclosure made in this United States patent is incorporated herein by reference. Thus the benefit employed by using an electrolyte thick paste wall separator along a substantial portion between the tapered bobbin and the anode will result in the reduction of the formation of spew within the cell. The use of the thin electrolyte paste wall separator at the lower portion between the tapered bobbin and the anode will insure that under abuse conditions, i.e., charging, zinc dendrites (trees) will be able to extend through the separator contacting the tapered bobbin and internally shorting the cell so as to prevent internal pressure buildup to a degree that could cause cell disassembly.

FIG. 2 shows a preferred embodiment of a tapered bobbin 3 formed around an electrode rod 6. Specifically, a minor portion of the height of the bobbin identified as h has a diameter identified as x' whereupon the upper portion of the bobbin is concave tapered (inwardly bowed) yielding an outside top diameter y'. The benefit of this type of tapered bobbin construction is that for height h a relatively thin electrolyte paste separator can be disposed between the bobbin and the anode so as to insure that under abuse conditions, zinc dendrites can easily extend through the paste separator to contact the bobbin and internally short the cell prior to excessive pressure buildup within the cell. The remaining heigh h' of the bobbin is concave tapered so as to allow the use of a relatively thick electrolyte paste separator between the bobbin and the anode thereby substantially improving the leakage resistance of the cell. In addition this type of configuration is ideally suited for being formed in a simple mold and being ejected without cracking.

Referring to FIG. 3 there is shown a cylindrical or round dry cell comprising the conventional zinc cup or can 10 containing the cathode mix cake 12 molded with a central carbon electrode rod 14, in the form of a tapered bobbin as shown in FIG. 1. The cathode mix cake 12 contains part of the cell electrolyte and the usual mixture of manganese dioxide and graphite or some form of carbon black, with the conventional addition of solid ammonium chloride. Separating the tapered cathode bobbin 12 from the sidewall of the zinc cup or can 10 is a homogeneous gelatinous electrolyte paste wall separator 16. The paste separator 16 may consist of the usual mixture of about two parts of corn starch and one part flour made into a gelatinous paste with the balance of the cell's electrolyte. An insulating member 18 such as a paper or cardboard washer is placed below the cathode bobbin within the bottom end of the zinc cup or can 10.

As shown in FIG. 3, the dry cell may be closed using a conventional insulating washer 20 which surrounds the carbon electrode rod 14 within the upper open end of the zinc cup or can 10. The insulating washer 20 is positioned a short distance above the cathode bobbin in order to provide an "air space" within the top of the cell as indicated at 22. For illustrative purposes, the cell has been shown in FIG. 3 with only the basic elements of its construction and it will be understood that in actual practice the cell may incorporate any one of various types of outer container structures as will readily occur to those skilled in the art.

Referring to FIG. 4, there is shown a similar type cylindrical cell as in FIG. 3 employing similar components identified with the same reference numbers. The only difference between th cell shown in FIG. 4 from that shown in FIG. 3 is that the tapered bobbin 24 is of the type shown in FIG. 2. Thus the cylindrical segment h of the bobbin 24 accommodates a thin paste separator segment 15 of separator 17 and the concave tapered segment h' of the bobbin 24 accommodates a thicker paste separator segment 19 whose wall thickness increases between anode 10 and bobbin 24. As stated above, this type of bobbin construction permits the advantages associated with the use of thin paste separators and thick paste separators to be obtained in a single cell.

EXAMPLE 1

A plurality of Leclanche D-size cells (Sample A) was produced as shown in FIG. 4 employing a zinc anode; a concave tapered cathode bobbin containing 57.5% by weight manganese dioxide, 6.4% by weight acetylene black, 4.1% by weight zinc chloride, 17.4% by weight ammonium chloride and 14.6% by weight water; a conventional electrolyte paste separator containing electrolyte, flour and starch; and a carbon rod. The concave tapered bobbin was 1.670 inches high and had an outside base diameter of 1.060 inches which extended upward for about 0.5 inch and then assumed a tapered configuration yielding an outside top diameter of 0.945.

A plurality of similar type Leclanche D-size cells (Sample B) was produced except that the bobbins employed were cylindrical in shape measuring 0.960 outside diameter by 1.750 inches high. This type of cell employed a thick paste separator as described in U.S. Pat. No. 3,615,859.

Four commercial type cells were put in a 5-cell flashlight along with a test cell (Sample A or B) which was put in reversed. The flashlight was lit for 24 hours and immediately thereafter the test cell of Sample A or Sample B was examined. The overall test of a plurality of Sample A and Sample B cells showed that 0.9% of Sample A cells were disassembled while 28% of Sample B cells were disassembled. The results of this test showed that there was a substantial decrease in cell disassembling using the tapered bobbin over the cylindrical bobbin employed with a thick paste separator.

EXAMPLE 2

A plurality of Sample A cells were constructed as described in Example 1, except that the bobbins had a concave tapered construction as generally shown in FIG. 2. A plurality of Sample B cells were constructed using a cylindrical bobbin having an outer diameter of 1.06 inches and being 1.640 inches high. The cells were subjected to the following three tests:

Test 1—Flashlight Continuous to 0.1 Volt and Performation Test

Cells discharged to perforations require a pretest procedure involving three additional flashlights and six cells. The three flashlights contain cells with jackets partially removed (curled ends intact) for easy observation of perforations. Perforations are defined as holes or cracks in the zinc can from which liquid exudes. After the pretest time has been established (all six cells have perforated) it is used in the main test which involves intact finished cells.

In the main test cells are placed in two-cell flashlights and are discharged in the "up", "down" or "side" positions for the period of time determined in the pretest. After discharge the cells are removed and stored (open circuit) for various time periods at an average room temperature at 23° C., with a relative humidity that averages about 50%. Inspections are made every month and the accumulated percentage of leaking cells are calculated. These data so obtained are shown in the Table for Sample A and Sample B cells.

Test 2—The 2.25 Ohm Continuous Load Test at 21° C.

In this test each cell is placed on a 2.25-ohm load for the entire duration of the test. Half of the cells are placed in the "up" (electrode cap up) and half in the "down" (electrode cap down) position. The environmental conditions are 21° C./50% relative humidity. Inspections are made every month and the accummulated percentage of leaking cells are calculated and the data so obtained are shown in the Table.

Test 3—The 2.25 Ohm Discontinuous Load Test at 21° C.

At the start of this test each cell is placed on the 2.25-ohm load for 7 days whereupon the cell is then open-circuited. Half of the cells are placed in the "up" position and half in the "down" position. The environmental conditions are 21° C./50% relative humidity. Inspections are made monthly and the accumulated percentage of leaking cells are calculated and the data so obtained are shown in the Table.

TABLE

| | Test #1 | | Test #2 | | Test #3 | |
|---|---|---|---|---|---|---|
| Months | Sample A (%) | Sample B (%) | Sample A (%) | Sample B (%) | Sample A (%) | Sample B (%) |
| 1. | 0 | 3 | 0 | 6 | 0 | 2 |
| 2. | 0 | 3 | 0 | 6 | 0 | 2 |
| 3. | 0 | 3 | 0 | 6 | 0 | 2 |
| 4. | 0 | 4 | 0 | 7 | 0 | 2 |
| 5. | 0 | 6 | 0 | 8 | 0 | 2 |
| 6. | 0 | 8 | 5 | 11 | 0 | 3 |

What is claimed is:

1. An electrochemical cell comprising in combination an anode; a cathode bobbin disposed within and separated from the anode, said cathode bobbin including a porous cathode mix cake comprising manganese dioxide as the active depolarizer material formed with a central electrode rod; and a separator containing an electrolyte solution interposed in the space between the anode and the cathode bobbin and being in contact with the surface of the anode and the surface of the cathode mix cake; the improvement wherein the cathode bobbin has a tapered form with at least a substantial portion of its outer upstanding wall tapered with respect to the longitudinal axis of the bobbin such that its outer diameter varies along the longitudinal axis of the bobbin so that the separator disposed between the outer wall of the tapered bobbin and the inner wall of the anode varied in wall thickness along the longitudinal axis of the bobbin.

2. The electrochemical cell of claim 1 wherein the intersection of the plane containing the longitudinal axis of the bobbin with the upstanding outer wall of the bobbin forms a line having at least one straight segment.

3. The electrochemical cell of claim 1 wherein the intersection of the plane containing the longitudinal axis of the bobbin with the upstanding outer wall of the bobbin forms a line having at least one curved segment.

4. The electrochemical cell of claim 1 wherein the intersection of the plane containing the longitudinal axis of the bobbin with the upstanding outer wall of the bobbin forms a line comprising at least one straight segment and at least on curved segment.

5. The electrochemical cell of claim 1 wherein the cathode bobbin has its outer upstanding wall forming a cylindrical base segment which extends to form a tapered upper segment with respect to the longitudinal axis of the bobbin.

6. The electrochemical cell of claim 5 wherein the tapered upper segment is concave tapered with respect to the longitudinal axis of the bobbin.

7. The electrochemical cell of claim 5 wherein the cylindrical base segment comprises between about 20% and 45% of the height of the bobbin.

8. The electrochemical cell of claim 6 wherein the cylindrical base segment comprises between about 20% and 45% of the height of the bobbin.

9. The electrochemical cell of claim 1, 2, 3, 4, 5, 6, 7 or 8 wherein the cathode is manganese dioxide, the anode is zinc and the electrolyte solution comprises zinc chloride, amonium chloride and water.

10. The electrochemical cell of claim 1, 2, 3, 4, 5, 6, 7 or 8 wherein the cathode is manganese dioxide, the anode is zinc and the electrolyte solution comprises zinc chloride and water.

* * * * *